United States Patent
Rockwell

(10) Patent No.: US 11,230,477 B2
(45) Date of Patent: Jan. 25, 2022

(54) REMOVABLE GREASE TRAP WITH DISPOSABLE LINER

(71) Applicant: David Rockwell, Lower Sackville (CA)

(72) Inventor: David Rockwell, Lower Sackville (CA)

( * ) Notice: Subject to any disclaimer, the term of this patent is extended or adjusted under 35 U.S.C. 154(b) by 0 days.

(21) Appl. No.: 17/264,715

(22) PCT Filed: Jul. 29, 2019

(86) PCT No.: PCT/CA2019/000113
§ 371 (c)(1),
(2) Date: Jan. 29, 2021

(87) PCT Pub. No.: WO2020/028968
PCT Pub. Date: Feb. 13, 2020

(65) Prior Publication Data
US 2021/0300796 A1    Sep. 30, 2021

(30) Foreign Application Priority Data
Aug. 9, 2018 (CA) .................. CA 3013767

(51) Int. Cl.
*E03F 5/16* (2006.01)
*C02F 1/40* (2006.01)
*B01D 17/02* (2006.01)
*C02F 103/32* (2006.01)
*C02F 101/32* (2006.01)

(52) U.S. Cl.
CPC ............ *C02F 1/40* (2013.01); *B01D 17/0208* (2013.01); *E03F 5/16* (2013.01); *C02F 2101/32* (2013.01); *C02F 2103/32* (2013.01); *C02F 2201/004* (2013.01); *C02F 2307/08* (2013.01)

(58) Field of Classification Search
CPC ...... E03F 5/14; E03F 5/16; C02F 1/40; B01D 17/0208; B01D 17/0211
USPC .............................................. 210/532.1, 538
See application file for complete search history.

(56) References Cited

U.S. PATENT DOCUMENTS

| | | | | |
|---|---|---|---|---|
| 2,338,971 A | * | 1/1944 | Milton | .................... C11B 13/00 210/532.1 |
| 4,268,392 A | * | 5/1981 | Hayes | .................... E03C 1/264 210/532.1 |
| 4,985,148 A | * | 1/1991 | Monteith | .................. E03F 5/16 210/532.1 |

(Continued)

FOREIGN PATENT DOCUMENTS

WO         9700716 A1    1/1997

*Primary Examiner* — Christopher Upton
(74) *Attorney, Agent, or Firm* — Bonini IP Law, LLC; Frank J. Bonini, Jr.

(57) ABSTRACT

A grease trap is provided. The grease trap comprises a container having an inlet opening and an outlet opening disposed in an upper portion thereof and a liner placed inside the container. The liner forms an enclosure and comprises a liner body having an inlet fitting and an outlet fitting mounted thereto. Each of the inlet fitting and the outlet fitting protrude the respective inlet opening and outlet opening and each of the inlet fitting and the outlet fitting are adapted for being connected to a plumbing system for receiving water containing FOG and for providing the water after separation of the FOG, respectively. An inlet baffle and an outlet baffle are disposed inside the liner body and mounted thereto. The inlet baffle and the outlet baffle each surround a respective inlet and outlet and extend downwardly therefrom.

17 Claims, 6 Drawing Sheets

(56) References Cited

U.S. PATENT DOCUMENTS

| | | | |
|---|---|---|---|
| 7,438,803 B1 * | 10/2008 | Allen | B01D 21/0003 |
| | | | 210/532.1 |
| 7,815,800 B2 * | 10/2010 | Komatsu | B01D 17/0211 |
| | | | 210/538 |
| 8,153,004 B2 * | 4/2012 | Rodriguez-Jovet | ........... |
| | | | B01D 17/0214 |
| | | | 210/538 |
| 9,932,247 B1 | 4/2018 | Batten et al. | |
| 2004/0195186 A1 | 10/2004 | Nicolia et al. | |
| 2007/0251879 A1 * | 11/2007 | Batten | E03F 5/16 |
| | | | 210/532.1 |
| 2009/0184049 A1 * | 7/2009 | Murray | B01D 17/0211 |
| | | | 210/532.1 |
| 2019/0100907 A1 * | 4/2019 | Son | C02F 1/40 |

* cited by examiner

REMOVABLE GREASE TRAP WITH DISPOSABLE LINER

FIELD OF THE INVENTION

The present invention relates to devices for intercepting grease before entering sewers, and more particularly to a removable grease trap with a disposable liner and a method of providing and maintaining the same.

BACKGROUND OF THE INVENTION

Restaurant and other foodservice kitchens produce a substantial amount of Fats, Oil, Grease (FOG), food particles, and other debris—referred to in the art as 'FOG' while the interceptor of the 'FOG' is commonly known in the art as 'grease trap', both terms will be used from hereon—which is present in the drain lines from various sinks, dishwashers, and other kitchen appliances. If not removed from the wastewater, the FOG can clump and cause blockage and back-up in the plumbing and sewage systems. Sewer blockages are the leading cause of municipal sewer overflows, and FOG is the primary cause of sewer blockages. Furthermore, FOG can disrupt wastewater utility operations and increase operations and maintenance requirements. For these reasons, nearly all municipalities require commercial kitchen operations to use devices for intercepting FOG before entering sewers.

Present day FOG traps are permanently installed plumbing fixtures which are opened and emptied by pumping using a pump truck or by manually scooping the contents. Because of unpleasant odors—for example, sulfur gas generated by the decay of the FOG accumulated in the trap—released by opening and cleaning the grease traps, they are usually cleaned at times when the restaurant is closed.

Most grease traps use baffles for separating the FOG from the wastewater. Due to thermal inversion, the efficiency of these grease traps is substantially reduced when the accumulated FOG is approximately 25% of their total capacity, thus requiring frequent cleaning.

Furthermore, due to the exposure to corrosive substances such as, for example, water, sulfur gas, etc. grease traps have a limited average life expectancy, typically 7 years for a metal trap, thus requiring frequent replacement of the complete grease trap.

It is desirable to provide a grease trap that is easily removed after use and replaced without causing unpleasant odors.

It is also desirable to provide a grease trap that is easily connected to and disconnected from a plumbing system.

It is also desirable to provide a grease trap having a disposable liner that is simple to remove and replace after use.

SUMMARY OF THE INVENTION

Accordingly, one object of the present invention is to provide a grease trap that is easily removed after use and replaced without causing unpleasant odors.

Another object of the present invention is to provide a grease trap that is easily connected to and disconnected from a plumbing system.

Another object of the present invention is to provide a grease trap having a disposable liner that is simple to remove and replace after use.

According to one aspect of the present invention, there is provided a grease trap. The grease trap comprises a container having an inlet opening and an outlet opening disposed in an upper portion thereof and a liner placed inside the container. The liner forms an enclosure and comprises a liner body having an inlet fitting and an outlet fitting mounted thereto. Each of the inlet fitting and the outlet fitting protrude the respective inlet opening and outlet opening and each of the inlet fitting and the outlet fitting are adapted for being connected to a plumbing system for receiving water containing FOG and for providing the water after separation of the FOG, respectively. An inlet baffle and an outlet baffle are disposed inside the liner body and mounted thereto. The inlet baffle and the outlet baffle each surround a respective inlet and outlet and extend downwardly therefrom.

According to the aspect of the present invention, there is provided a grease trap. The grease trap comprises a container having an inlet opening and an outlet opening disposed in an upper portion thereof and a liner placed inside the container. The liner forms an enclosure and comprises a liner body having an inlet fitting and an outlet fitting mounted thereto. Each of the inlet fitting and the outlet fitting protrude the respective inlet opening and outlet opening and each of the inlet fitting and the outlet fitting are adapted for being connected to a plumbing system for receiving water containing FOG and for providing the water after separation of the FOG, respectively. An inlet baffle and an outlet baffle are disposed inside the liner body and mounted thereto. The inlet baffle and the outlet baffle each surround a respective inlet and outlet and extend downwardly therefrom. The fittings comprise a liner mounting portion mounted to the liner body in a sealed manner and a connecting portion protruding the respective opening, the connecting portion being adapted for being connected to the plumbing system. The liner body and the baffles are made of a flexible plastic material. The fittings are movably accommodated in the respective openings of the container for facilitating connecting the same to the plumbing system.

According to the aspect of the present invention, there is provided a method for trapping FOG in a plumbing system. The container of the grease trap described hereinabove is placed at a predetermined location. The inlet fitting and the outlet fitting are connected to the plumbing system. After use, the inlet fitting and the outlet fitting are disconnected from the plumbing system and sealed. The grease trap is then removed. For preparing the grease trap for re-use the used liner and its contents are removed from the container and a new liner is placed inside the container. Optionally, the fittings are removed from the liner body and cleaned for re-use.

According to the aspect of the present invention, there is provided a liner for a grease trap. The liner comprises a liner body forming an enclosure and is adapted for being disposed inside a container of the grease trap. The liner body has a liner inlet opening and a liner outlet opening placed at predetermined locations coinciding with respective locations of an inlet opening and an outlet opening of the container when disposed therein. An inlet baffle and an outlet baffle are adapted for being mounted to the liner body such that the inlet baffle and the outlet baffle each surround the respective liner inlet opening and the liner outlet opening and extend downwardly therefrom. The liner may further comprise an inlet fitting and an outlet fitting mounted to the liner body. Each of the inlet fitting and the outlet fitting is adapted for protruding the respective inlet opening and outlet opening of the container and each of the inlet fitting and the outlet fitting is adapted for being connected to a plumbing system.

The advantage of the present invention is that it provides a grease trap that is easily removed after use and replaced without causing unpleasant odors.

A further advantage of the present invention is that it provides a grease trap that is easily connected to and disconnected from a plumbing system.

A further advantage of the present invention is to provide a grease trap having a disposable liner that is simple to remove and replace after use.

BRIEF DESCRIPTION OF THE DRAWINGS

A preferred embodiment of the present invention is described below with reference to the accompanying drawings, in which.

DESCRIPTION OF THE PREFERRED EMBODIMENT

Unless defined otherwise, all technical and scientific terms used herein have the same meaning as commonly understood by one of ordinary skill in the art to which the invention belongs. Although any methods and materials similar or equivalent to those described herein can be used in the practice or testing of the present invention, the preferred methods and materials are now described.

Figure 1A:
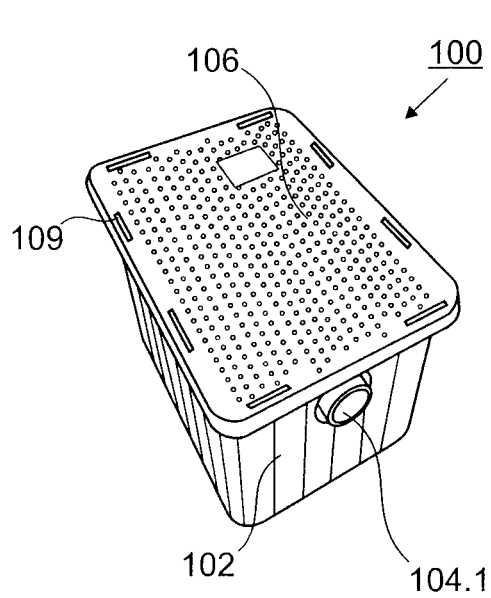
FIGS. 1a and 1b are simplified block diagrams illustrating top perspective views of a closed and open container, respectively, of the grease trap according to a preferred embodiment of the invention.
Figure 1B:
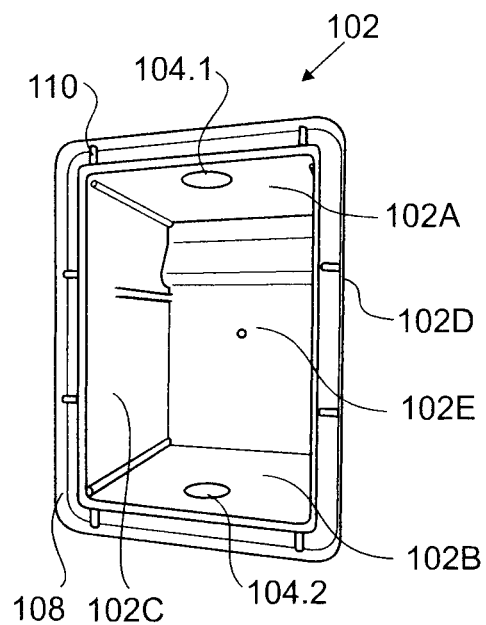

Referring to FIGS. 1a to 1l a grease trap 100 according to a preferred embodiment of the invention is provided. The grease trap 100 comprises a container body 102 having an inlet opening 104.1 and an outlet opening 104.2 disposed in an upper portion thereof, as illustrated in FIGS. 1a to 1b. Preferably, the container 102 comprises bottom wall 102E and walls 102A to 102D extending upwardly therefrom, with opposite walls 102A and 102B comprising the inlet opening 104.1 and the outlet opening 104.2. Rim structure 108, disposed at a top end of the container body 102, is adapted for accommodating container lid 106 when placed thereupon and comprises, for example, securing elements 110 for securing the container lid 106 to the container body 102 via pivotally movable hook elements 109. Alternatively, the container lid 106 may be secured to the container body 102 using, for example, conventional clamps or screw fasteners. The container body 102 and the container lid 106 are made of, for example, a suitable plastic material such as recyclable PolyEthylene (PE) using a conventional plastic molding process.

Optionally, the container body 102 is provided with wheels or casters for facilitating moving and placing of the grease trap 100.

Figure 1C:
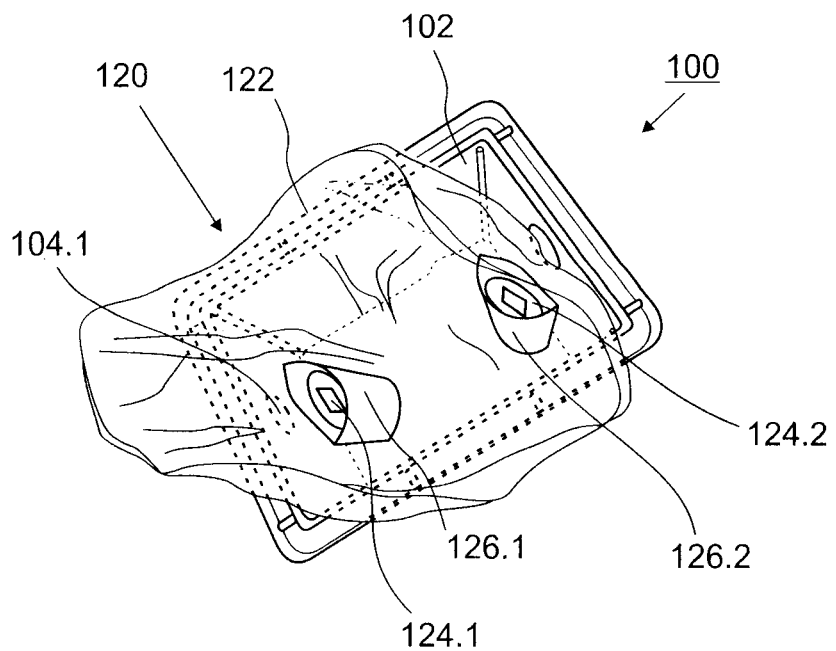
FIG. 1c is a simplified block diagram illustrating a top perspective view of the open container with a liner placed therein of the grease trap according to the preferred embodiment of the invention.

A liner 120 is loosely placed inside the container body 102, as illustrated in FIG. 1c, enabling simple exchange of liners 120 by simply pulling the used liner upward and out of the container body 102 and disposing a new clean liner 120 therein, as will be described hereinbelow. The liner 120 forms an enclosure and has a liner body 122 of, for example, a bag-type structure that is open at the top, as illustrated in FIG. 1c, for facilitating emptying of the same. Preferably, the liner body 122 is adapted to substantially fit to the inside dimensions of the container body 102

Inlet fitting 124.1 and outlet fitting 124.2 are mounted to the liner body 122. Each of the inlet fitting 124.1 and the outlet fitting 124.2 are designed to protrude into the respective inlet opening 104.1 and outlet opening 104.2 with each of the inlet fitting 124.1 and the outlet fitting 124.2 being adapted for being connected, for example, via respective couplings mated therewith, to a plumbing system for receiving water containing FOG and for providing the water after separation of the FOG therefrom to the sewer system, respectively.

Inlet baffle 126.1 and outlet baffle 126.2 are disposed inside the liner body 122 and mounted thereto. The inlet baffle 126.1 and the outlet baffle 126.2 each surround a respective inlet and outlet and extend downwardly therefrom. The inlet baffle 126.1 directs the incoming water containing FOG downward to the bottom of the liner body 122, while the outlet baffle 126.2 prevents the accumulated FOG from reaching the outlet and, consequently, the sewer system, as will be described hereinbelow.

Figure 1D:
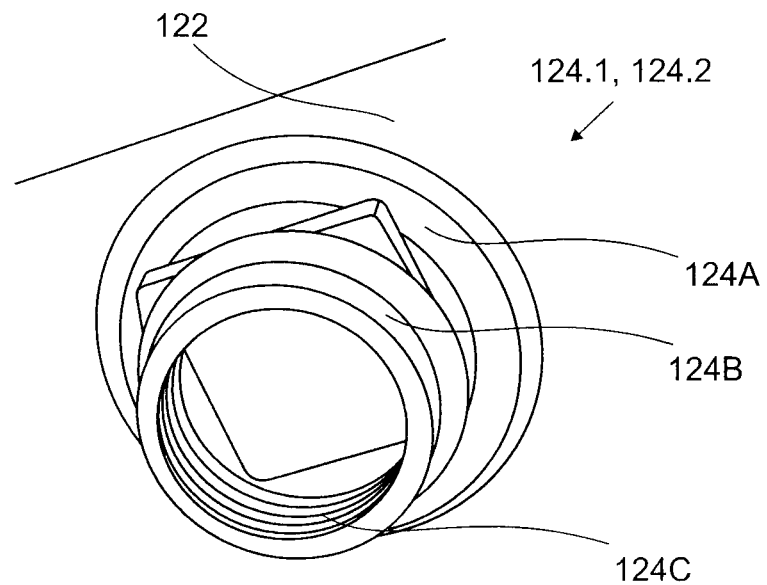
FIGS. 1d and 1e are simplified block diagrams illustrating perspective views of a fitting and the fitting mated with a coupling, respectively, of the grease trap according to the preferred embodiment of the invention.
Figure 1E:
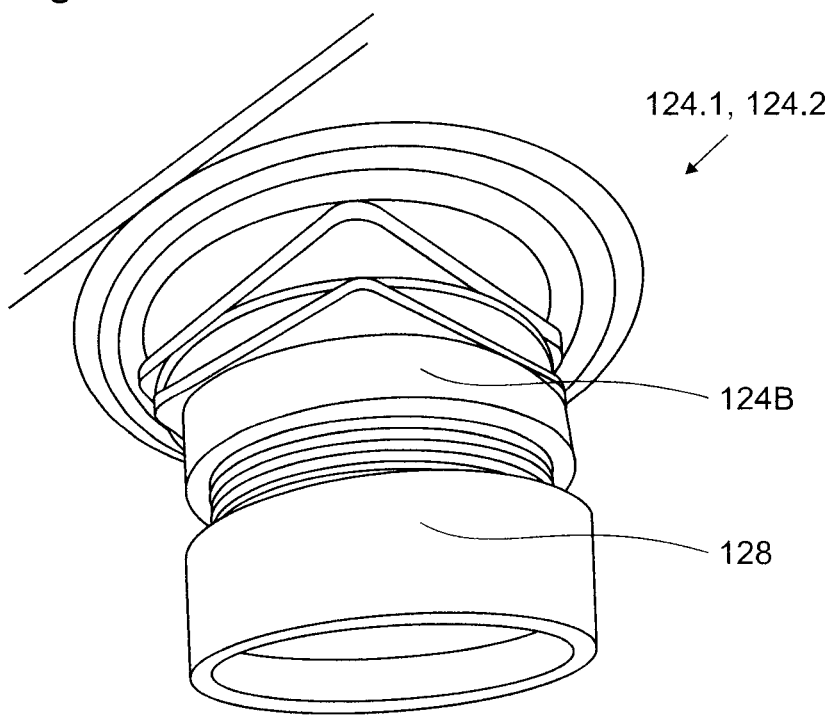

The fittings 124.1, 124.2 each comprise a liner mounting portion 124A mounted to the liner body 122 in a sealed manner and a connecting portion 124B, as illustrated in FIG. 1d. The connecting portion 124B comprises, for example, an inside 2" screw fitting 124C which can be connected to the plumbing system via a respective 2" coupling 128, as illustrated in FIG. 1e. The connecting portion 124B together with the coupling 128 are adapted to protrude the respective opening 104. For example, after placing the liner 120 into the container body 102 the connecting portion 124B is inserted into the respective opening 104, as indicated by the block arrow in FIG. 1f, and accommodated therein, as illustrated in FIG. 1g. The coupling 128 is then connected to the connecting portion 124B by mating the respective screw threads of the connecting portion 124B and the coupling 128, as illustrated in FIG. 1h.

Preferably, the liner body 122 is made of a flexible plastic material such as, for example, thin recyclable PE sheet material having, for example, a thickness in the range between 2 mil (0.002") and 6 mil (0.006") for providing sufficient strength as well as sufficient flexibility of the liner body 122. The fittings 124.1, 124.2 are also made of a plastic material such as, for example, recyclable PE using a conventional plastic molding process.

The connecting portion 124B and the coupling 128 are adapted such that the coupling 128 protrudes the opening 104 when mated with the connecting portion 124B, enabling handling of the same for connecting to the plumbing system. Preferably, the connecting portion 124B and the coupling 128 are designed to have a smaller outside diameter than an inside diameter of the opening 104, for example, a difference between the outside diameter and the inside diameter in the range between ½" and 1", together with the flexibility of the liner body 122 the difference in diameter enables movement between the connecting portion 124B and the coupling 128 and the opening 104 along axis 105 and perpendicular thereto, as indicated by the block arrows in FIGS. 1g and 1h, for facilitating connecting of the coupling 128 to the plumbing system.

Preferably, the liner mounting portion 124A of the fittings 124 is mounted to the liner body 122 using a conventional plastic welding process such as, for example, a hot air welding process. For facilitating the plastic welding process and ensuring a proper seal, the liner mounting portion 124A is preferably, designed to have a sufficiently large and substantially flat surface surrounding the opening. It is noted that the fittings 124 may be re-used—while the liner body 122 is disposed of—by separating the fittings 124 from the liner body 122, cleaning them in a conventional manner, and plastic welding them to a new liner body 122.

Further preferably, the baffles 126 are made of a flexible plastic material such as, for example, recyclable PE sheet material having, for example, a thickness in the range between 20 mil (0.020") and 60 mil (0.060") for providing sufficient strength. For example, a plurality of layers of the same material used for the liner body 122 may be employed. The baffles 126 are, preferably, mounted to the liner body 122 using a conventional plastic welding process such as, for example, a hot air welding process.

Figure 1F:
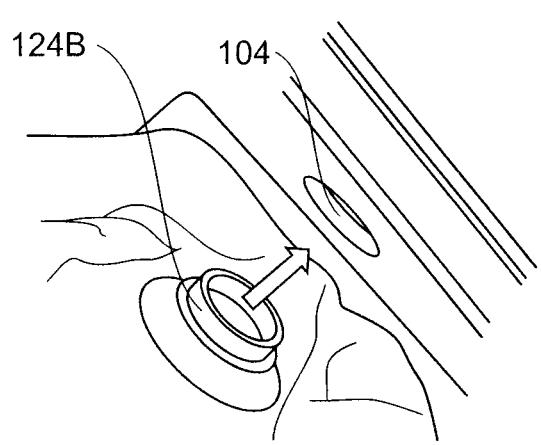
FIG. 1f is a simplified block diagram illustrating a perspective view of the fitting being inserted into a container opening of the grease trap according to the preferred embodiment of the invention.
Figure 1G:
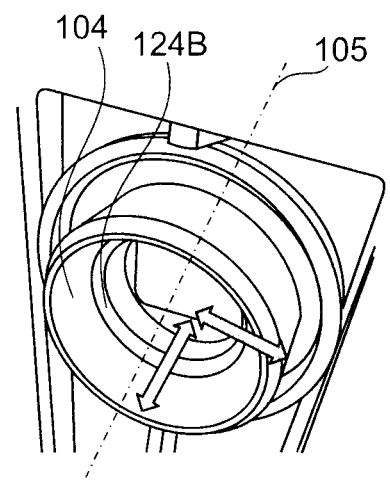
FIG. 1g is a simplified block diagram illustrating a perspective view of the fitting inserted into the container opening of the grease trap according to the preferred embodiment of the invention.
Figure 1H:
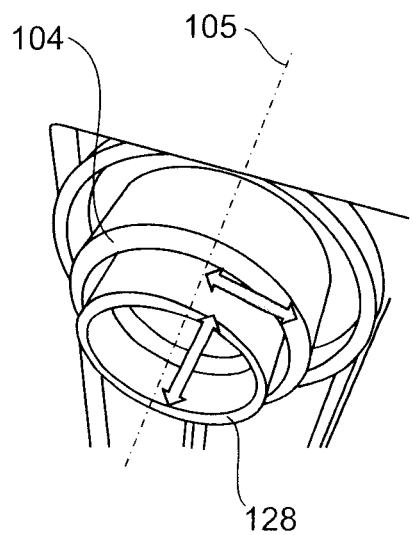
FIG. 1h is a simplified block diagram illustrating a perspective view of the coupling mated with the inserted fitting inserted of the grease trap according to the preferred embodiment of the invention.
Figure 1I:
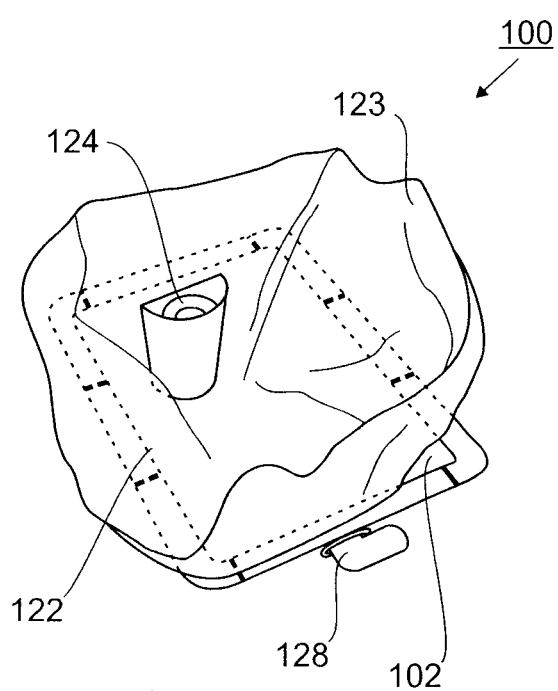
FIG. 1i is a simplified block diagram illustrating a top perspective view of the open container with the liner placed therein and the fittings/couplings accommodated in the respective openings of the container of the grease trap according to the preferred embodiment of the invention.
Figure 1J:
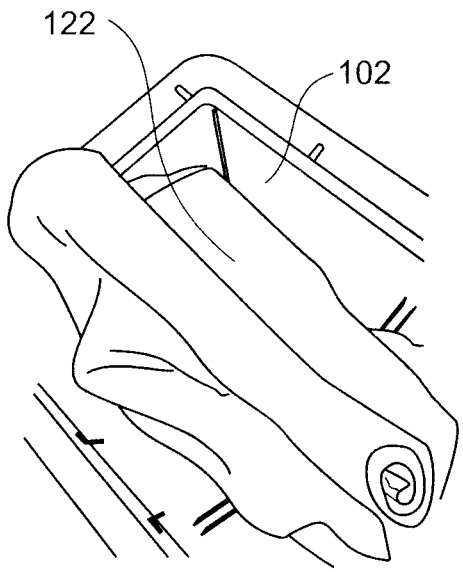
FIGS. 1j to 1k are simplified block diagrams illustrating top perspective views of the container illustrated in FIG. 1i with the top of the liner rolled up and clamped, respectively, of the grease trap according to the preferred embodiment of the invention.
Figure 1K:
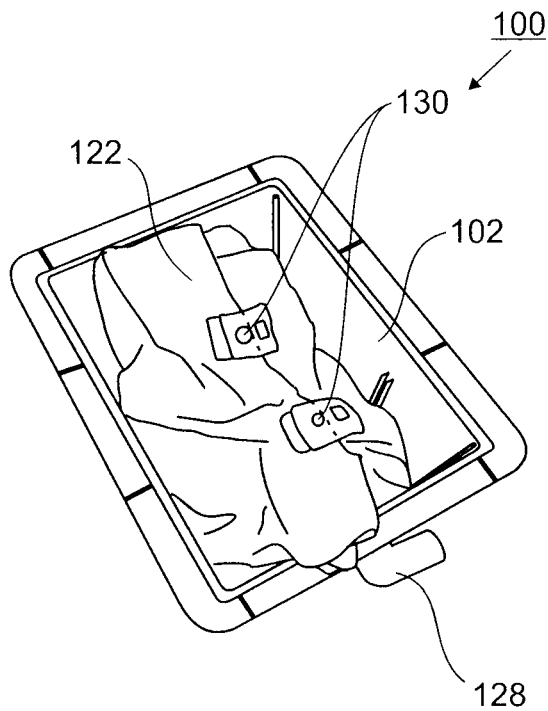
Figure 1L:
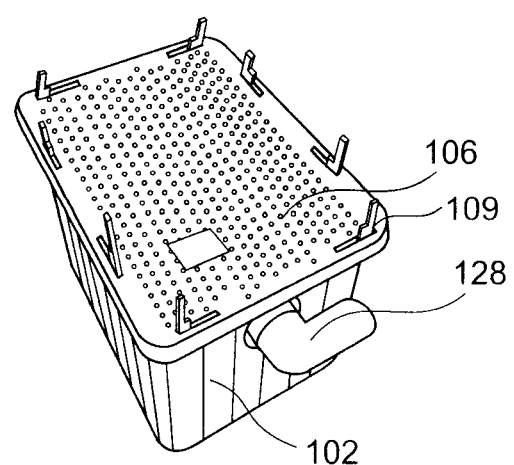
FIG. 1l is a simplified block diagram illustrating a top perspective view of the grease trap according to the preferred embodiment of the invention ready for use.

Provision of the liner 120 enables a simple process for preparing the grease trap 100 for re-use by simply placing the liner body 122 onto the bottom 102E of the container 102, as illustrated in FIG. 1c, followed by inserting the connecting portion 124B of the inlet fitting 124.1 and the outlet fitting 124.2 into the respective inlet aperture 104.1 and outlet aperture 104.2, as illustrated in FIGS. 1f and 1g, and mating with the respective coupling 128, as illustrated in FIGS. 1h and 1i. The top of the liner body 122 is then closed, for example, by rolling the top portion, as illustrated in FIG. 1j and securing the same using conventional fasteners such as, for example, clamps 130, as illustrated in FIG. 1k. Alternatively, other fasteners such as, for example, tape may be employed. Further alternatively, the liner body 122 may be heat sealed at the top after the baffles are heat welded to the inside of the liner body 122. Optionally, a portion of the top of the liner body 122 may be extended to form a handle for facilitating removal of the liner 120 from the container 102. After placing and securing the lid 106 to the container 102, as illustrated in FIG. 1l, the grease trap 100 is ready for installation and use.

Figure 2A:
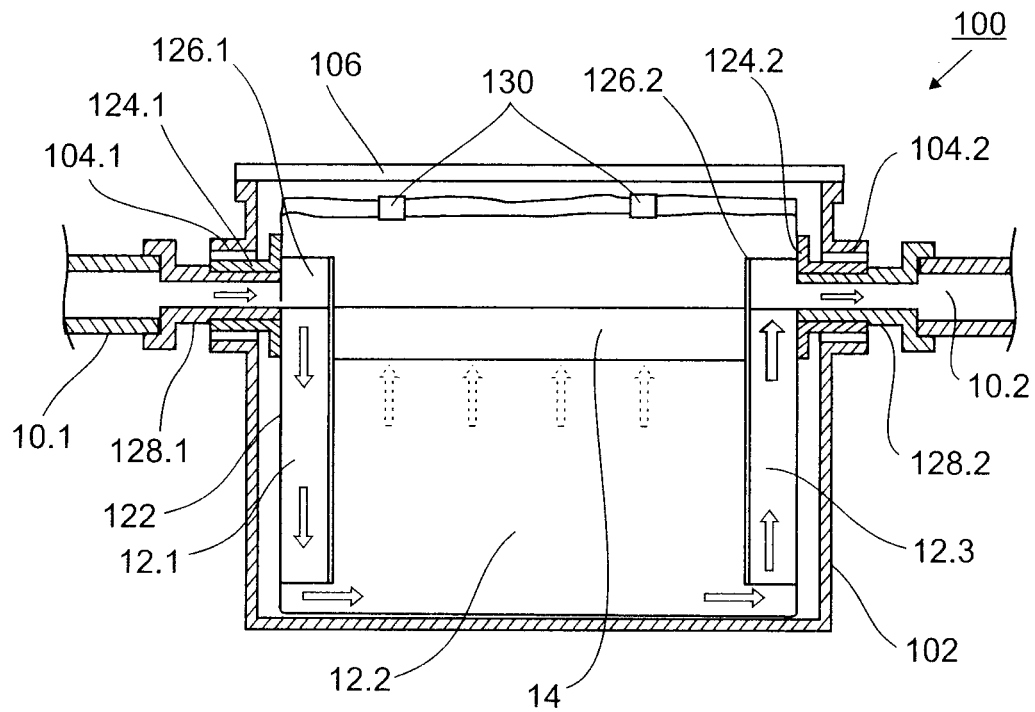
FIGS. 2a and 2b are simplified block diagrams illustrating cross-sectional views of the grease trap according to the preferred embodiment of the invention during operation and ready for removal after use; and, FIGS. 3a and 3b are simplified block diagrams illustrating in top perspective views dimensions of the container and the liner, respectively, of an example implementation of the grease trap according to the preferred embodiment of the invention.

In operation, as illustrated in FIG. 2a, water containing FOG is received from inlet plumbing pipe 10.1 and guided via inlet coupling 128.1 and inlet fitting 124.1 into the liner body 122. Baffle 126.1 then directs the water containing FOG 12.1 downward to the bottom of the liner body 122. While inside the liner body the FOG—having a lower density than the water 12.2—separates therefrom and accumulates 14 on top of the water 12.2. After separation, baffle 126.2 directs the water 12.3 to outlet fitting 124.2 for provision to outlet plumbing pipe 10.2 via coupling 128.2 while preventing the accumulated FOG 14 from reaching the outlet fitting 124.2.

Figure 2B:
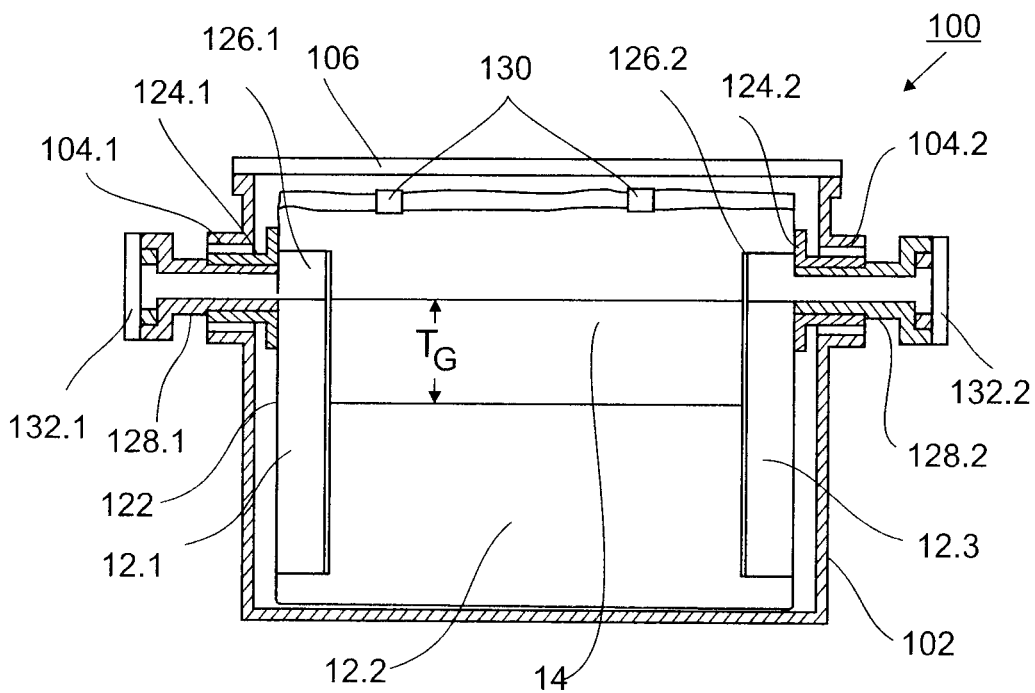

Referring to FIG. 2b after use, for example, after a predetermined time interval—preferably, determined such that the thickness $T_G$ of the accumulated FOG 14 is below a threshold where the efficiency of the grease trap 100 starts to decrease due to "thermal inversion"—the grease trap 100 is disconnected from the inlet plumbing pipe 10.1 and the outlet plumbing pipe 10.2 and caps 132.1 and 132.2 are mated with the respective couplings 128.1 and 128.2 to prevent spillage of the contents as well as unpleasant odors during removal of the grease trap 100.

The grease trap 100 enables a very simple, efficient, and substantially safe method for trapping FOG in the plumbing systems of restaurant and other foodservice kitchens. The grease trap 100—ready for use as illustrated in FIG. 1l—is placed at a predetermined location on-site of the respective restaurant or foodservice kitchen. After proper placement, the inlet fitting 124.1 is connected, for example, via inlet coupling 128.1 to inlet plumbing pipe 10.1 for receiving the water containing FOG therefrom, as illustrated in FIG. 2a, and the outlet fitting 124.2 is connected, for example, via outlet coupling 128.2 to outlet plumbing pipe 10.2 connected to a sewer system for providing the water after separation of the FOG thereto.

After elapse of a predetermined time interval, as described hereinabove, the grease trap 100 is disconnected from the inlet plumbing pipe 10.1 and the outlet plumbing pipe 10.2. After mating the caps 132.1 and 132.2 with the respective couplings 128.1 and 128.2, as illustrated in FIG. 2b, the used grease trap 100 is removed and replaced with a clean grease trap 100 which is then installed as described hereinabove.

After removal of the used grease trap 100 from the site of operation, the same is prepared for re-use as follows:
  a) the container lid 106 of the used grease trap 100 is removed from the container body 102;
  b) the liner 120 is opened while remaining in the container body 102 and the contents is pumped therefrom for conventional processing/disposal;
  c) the couplings 128.1 and 128.2 are removed from the respective fittings 124.1 and 124.2;
  d) the liner 120 is removed from the container body 102 and disposed thereof; and,
  e) the grease trap 100 is prepared for re-use as described hereinabove with respect to FIGS. 1c, and 1f to 1l.

It is noted that in step e) the same couplings 128.1 and 128.2 may be employed after cleaning the same in a conventional manner.

Alternatively, the liner 120 is removed from the container body 102 with the contents still therein.

Optionally, the fittings 124.1 and 124.2 are removed/cut from the used liner body 122 and cleaned in a conventional manner. The cleaned fittings 124.1 and 124.2 are then re-used by welding the same to a new liner body 122 using a conventional plastic welding process while the used liner body 122 is disposed.

Provision and maintenance of the grease traps 100 may be executed by a service provider specializing in the cleaning of grease traps and disposal of the FOG. For example, a delivery vehicle such as, for example, a pick-up truck or van, is loaded with clean grease traps 100, as illustrated in FIG. 1l, for servicing a plurality of restaurant and foodservice kitchens by exchanging the used grease traps 100 with the clean grease traps 100 loaded on the delivery vehicle. The used grease traps 100 are then transported to a processing station for replacing the used liners 120 with new liners 120 for re-use and disposal of the used liners 120 and the contents thereof.

Optionally, the service provider removes the fittings 124.1, 124.2 from the used liner body 122 for re-use by cleaning the same and mounting them to a new liner body 122 using a conventional plastic welding process.

Alternatively, the used liners 120 are replaced on the truck, obviating the transport of the complete grease traps 100 and allowing use of the same grease trap 100 at each specific location. However, this method requires a larger delivery vehicle such as a truck for accommodating means for emptying and disposing of the liners 120 on the truck and a longer time spent for servicing each location.

Figure 3A:
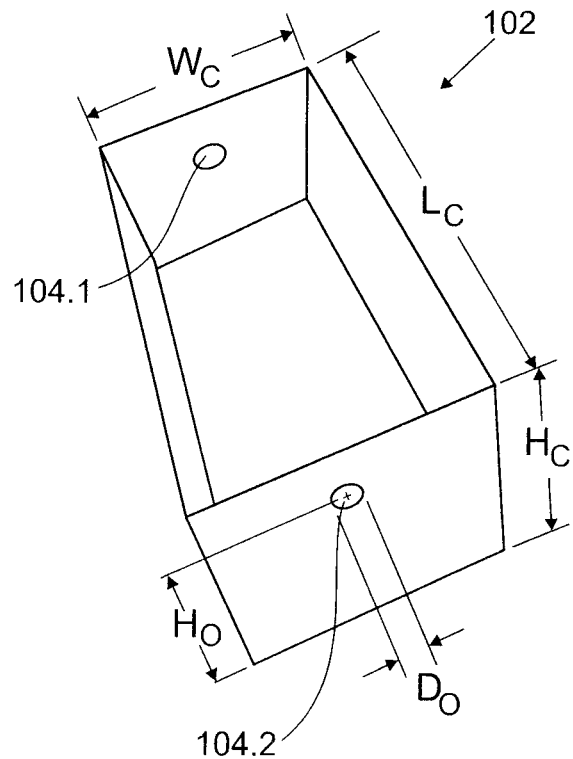
Figure 3B:
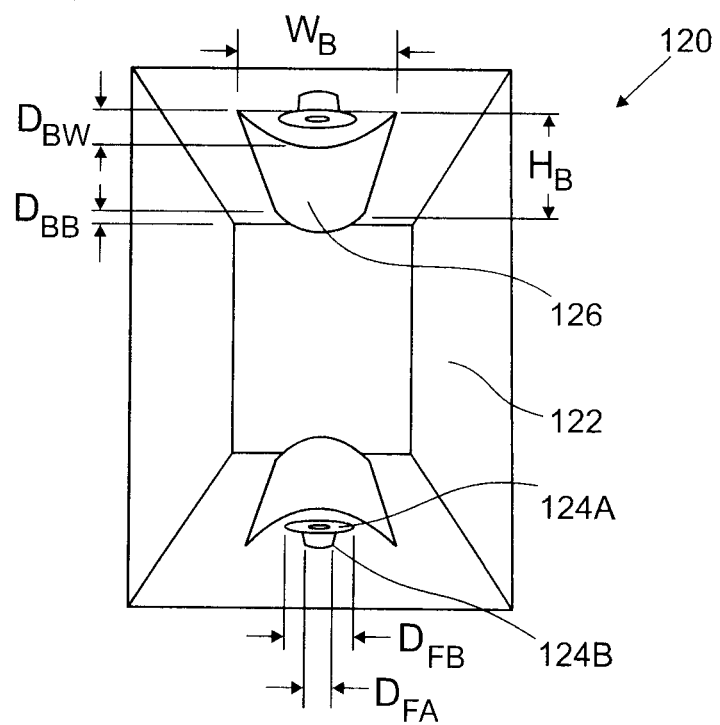

In an example implementation, as illustrated in FIGS. 3a and 3b, the grease trap 100 comprises a container body 102 having: a length $L_C$ of 23.5"; width $W_C$ of 17.5"; height $H_C$ of 16.3"; height $H_O$ of the inlet and outlet openings 104.1, 104.2 of 12.5" (floor to the center of the opening); and, diameter $D_O$ of the inlet and outlet openings 104.1, 104.2 of 3". The liner 120 comprises the liner body 122 made of PE having a thickness of 4 mil (0.004"). The baffles 126.1, 126.2 are made of PE having a thickness of 40 mil (0.040") and have: width $W_B$ of 9"; distance from the wall $D_{BW}$ of 3"; height $H_B$ of 12"; and distance from the liner bottom $D_{BB}$ of 1.5". The liner mounting portion 124A of the fittings 124.1, 124.2 have a diameter DFA of 4⅝" and the connecting portion 124B of the fittings 124.1, 124.2 have a diameter DFB of 2.5".

The present invention has been described herein with regard to preferred embodiments. However, it will be obvious to persons skilled in the art that a number of variations and modifications can be made without departing from the scope of the invention as described herein.

The embodiments of the invention in which an exclusive property or privilege is claimed are defined as follows:

1. A grease trap comprising:
 a container having an inlet opening and an outlet opening disposed in an upper portion thereof; and,
 a liner placed inside the container, the liner forming an enclosure and having:
  a liner body;
  an inlet fitting and an outlet fitting mounted to the liner body, each of the inlet fitting and the outlet fitting protruding the respective inlet opening and outlet opening and each of the inlet fitting and the outlet fitting being adapted for being connected to a plumbing system for receiving water containing FOG and for providing the water after separation of the FOG, respectively; and,
  an inlet baffle and an outlet baffle disposed inside the liner body and mounted thereto, the inlet baffle and the outlet baffle each surrounding a respective inlet and outlet and extending downwardly therefrom.

2. The grease trap according to claim 1 wherein the fittings comprise a liner mounting portion mounted to the liner body in a sealed manner and a connecting portion protruding the respective opening, the connecting portion being adapted for being connected to the plumbing system.

3. The grease trap according to claim 2 wherein the fittings are movably accommodated in the respective openings of the container for facilitating connecting the same to the plumbing system.

4. The grease trap according to claim 1 wherein the liner body and the baffles are made of a flexible plastic material.

5. The grease trap according to claim 4 wherein the baffles are plastic welded to the liner body.

6. The grease trap according to claim 4 wherein the fittings are made of a plastic material and wherein fittings are plastic welded to the liner body.

7. The grease trap according to claim 4 wherein the container comprises a container body and a container lid and wherein the liner is loosely placed inside the container body.

8. The grease trap according to claim 7 wherein the liner body has a bag type structure that is open at the top.

9. The grease trap according to claim 7 wherein the top of the liner body is closed after being placed into the container body.

10. A method for trapping FOG in a plumbing system comprising:
 providing the grease trap according to claim 1;
 placing the container at a predetermined location; and,
 connecting the inlet fitting and the outlet fitting to the plumbing system.

11. The method according to claim 10 comprising:
 disconnecting the inlet fitting and the outlet fitting from the plumbing system;
 sealing the inlet fitting and the outlet fitting; and,
 removing the grease trap.

12. The method according to claim 11 comprising:
 removing the liner and its contents from the container; and,
 placing a new liner inside the container.

13. The method according to claim 12 comprising disposing of the liner and its contents.

14. The method according to claim 12 comprising:
 removing the fittings from the liner body;
 cleaning the fittings for re-use; and,
 disposing of the liner body and its contents.

15. The method according to claim 14 comprising mounting the cleaned fittings to a new liner body in a sealed manner.

16. A liner for a grease trap comprising:
 a liner body forming an enclosure, the liner body being adapted for being disposed inside a container of the grease trap, the liner body having a liner inlet opening and a liner outlet opening placed at predetermined locations coinciding with respective locations of an inlet opening and an outlet opening of the container when disposed therein; and,
 an inlet baffle and an outlet baffle adapted for being mounted to the liner body such that the inlet baffle and the outlet baffle each surround the respective liner inlet opening and a liner outlet opening and extend downwardly therefrom.

17. The liner according to claim 16 comprising an inlet fitting and an outlet fitting mounted to the liner body, each of the inlet fitting and the outlet fitting being adapted for protruding the respective inlet opening and outlet opening of the container and each of the inlet fitting and the outlet fitting being adapted for being connected to a plumbing system.

* * * * *